United States Patent [19]

Willie et al.

[11] Patent Number: 4,767,652
[45] Date of Patent: Aug. 30, 1988

[54] PRESSURE RETAINING ENCLOSURE

[75] Inventors: Marc Willie, Baal; Rik Verhoeven; Rik Van Emelen, both of Kessel-lo, all of Belgium

[73] Assignee: Raychem Corporation, Menlo Park, Calif.

[21] Appl. No.: 908,487

[22] Filed: Sep. 17, 1986

Related U.S. Application Data

[63] Continuation of Ser. No. 689,623, Jan. 8, 1985, Pat. No. 4,614,557.

[51] Int. Cl.[4] .............................................. H02G 15/18
[52] U.S. Cl. ...................................... 428/36; 428/343; 428/347; 174/DIG. 8; 174/92
[58] Field of Search .......................... 428/36, 343, 347; 174/DIG. 8, 92; 156/85, 86

[56] References Cited

U.S. PATENT DOCUMENTS

| | | | |
|---|---|---|---|
| 2,027,962 | 1/1936 | Currie | 18/55 |
| 3,086,242 | 4/1963 | Cook et al. | 18/1 |
| 3,455,336 | 7/1969 | Ellis | 138/156 |
| 3,597,372 | 8/1971 | Cook | 428/36 |
| 4,035,534 | 6/1977 | Nyberg | 428/36 |
| 4,436,566 | 3/1984 | Tight, Jr. | 174/92 |
| 4,466,846 | 8/1984 | Nolf et al. | 174/DIG. 8 |

Primary Examiner—John E. Kittle
Assistant Examiner—James J. Seidleck
Attorney, Agent, or Firm—Herbert G. Burkard

[57] ABSTRACT

An enclosure (1) around a substrate (3) such as a telecommunications cable is made pressure retaining by the provision of re-entrant seals (5), generally V-shaped in cross-section, that are positioned at the region where the enclosure is bonded (4) to the substrate pressure within the enclosure thus tends to open the V rather than put the bond in peel. The re-entrant seals may be cut-to-length in the field and a leak path through the resulting open end (23) avoided by using pressure (P) within the enclosure to close the open end or to balance pressure across it.

9 Claims, 7 Drawing Sheets

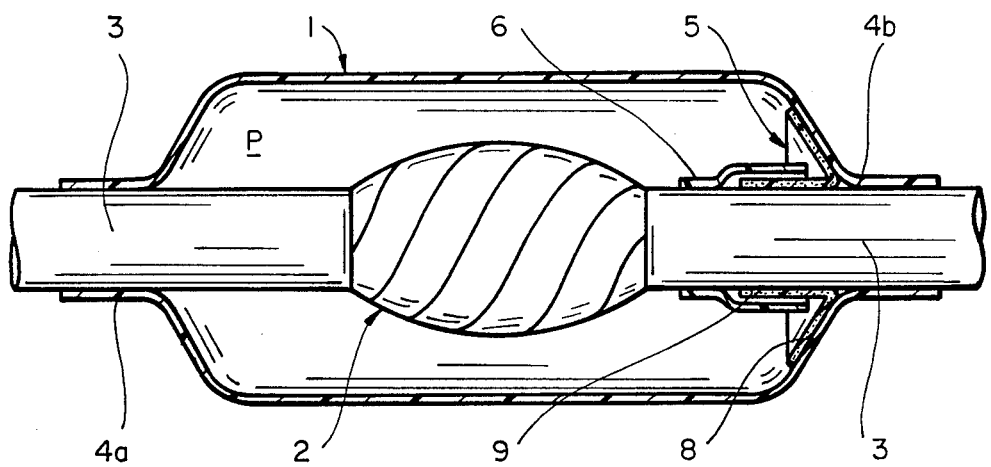
FIG_1
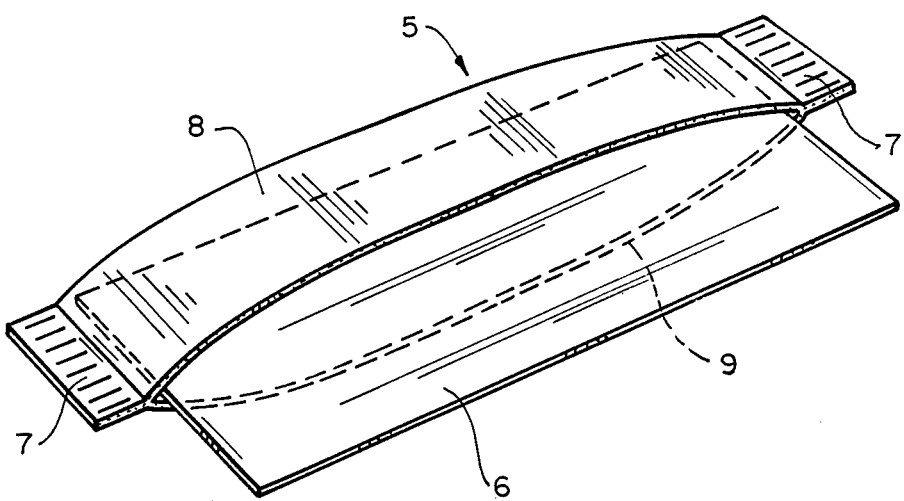
FIG_2
(PRIOR ART)

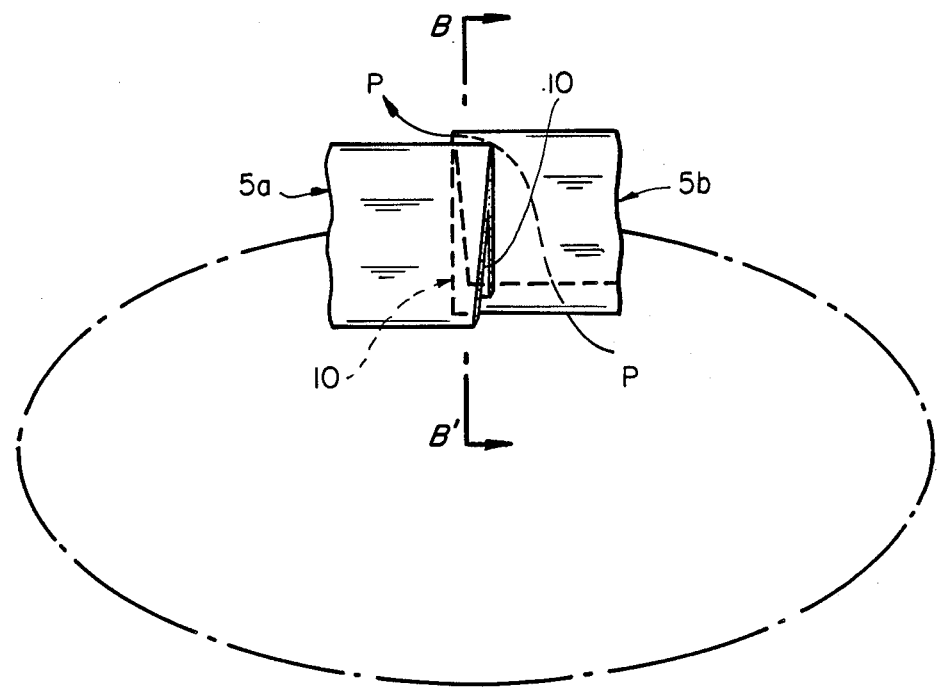
FIG_3a
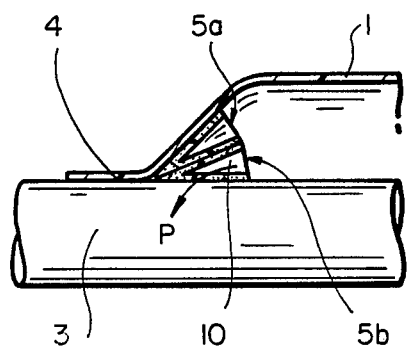
FIG_3b

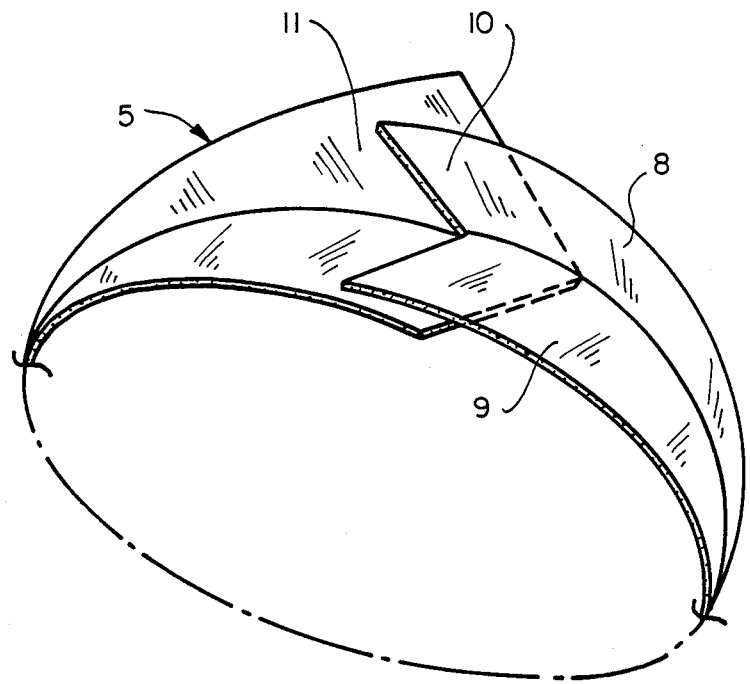
FIG_4a
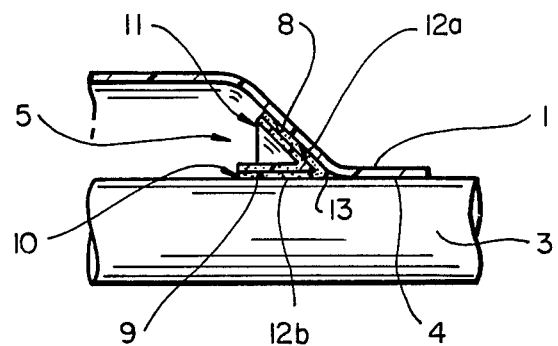
FIG_4b

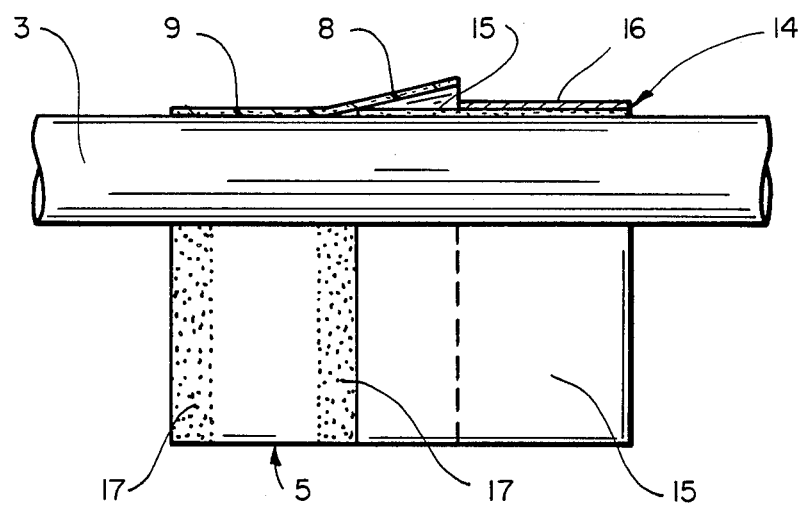
FIG_5a
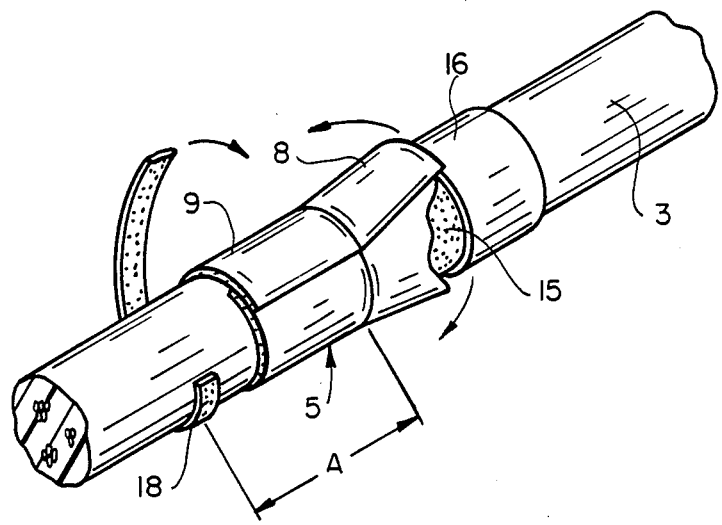
FIG_5b

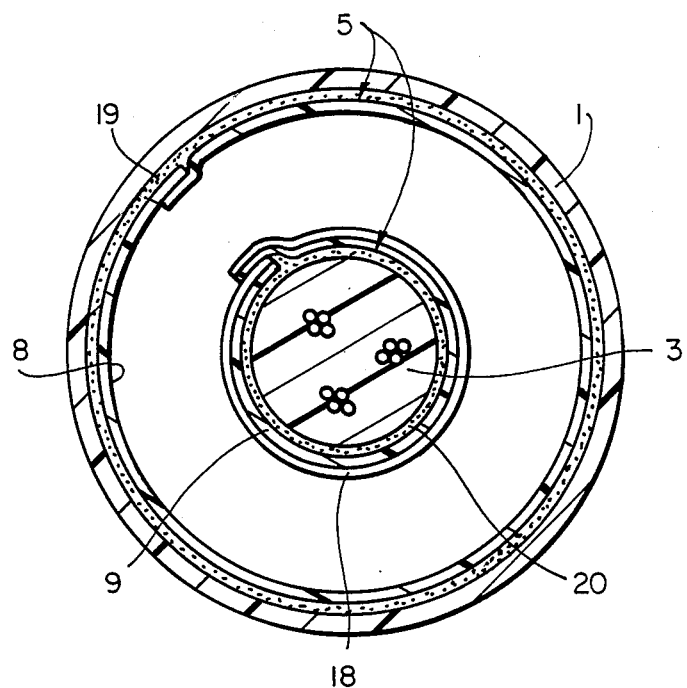
FIG_6
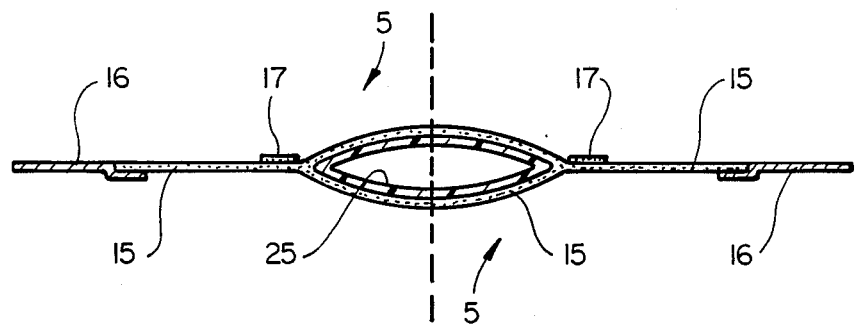
FIG_9

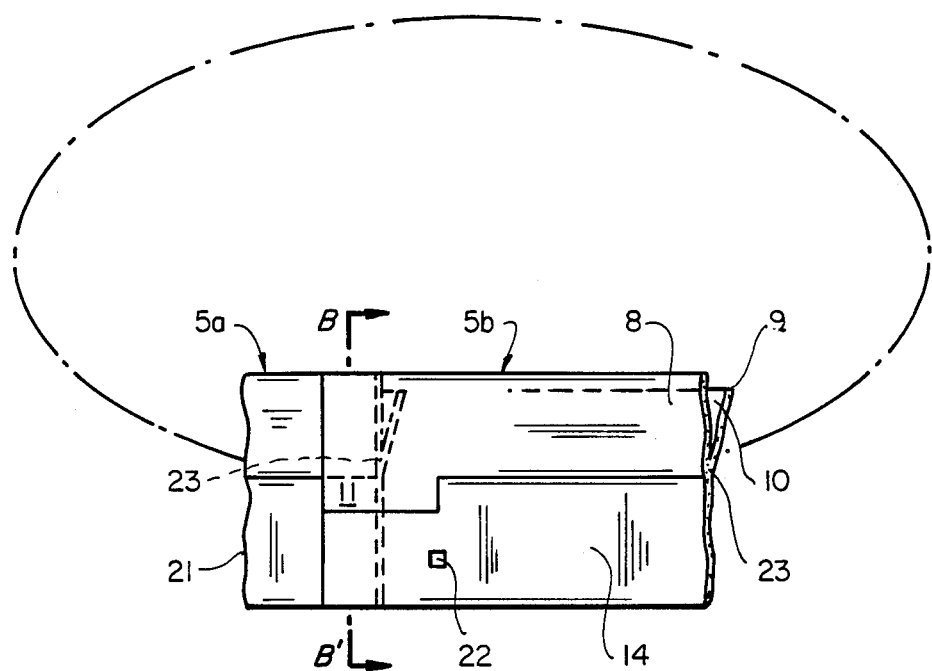
FIG_7a
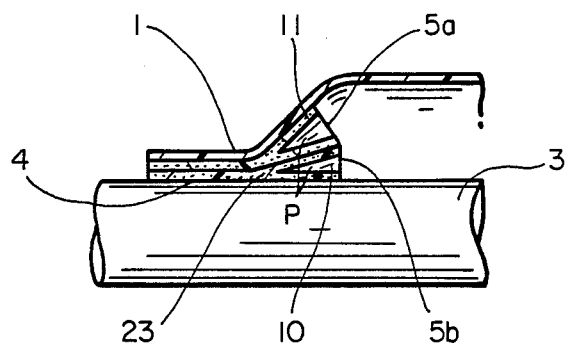
FIG_7b

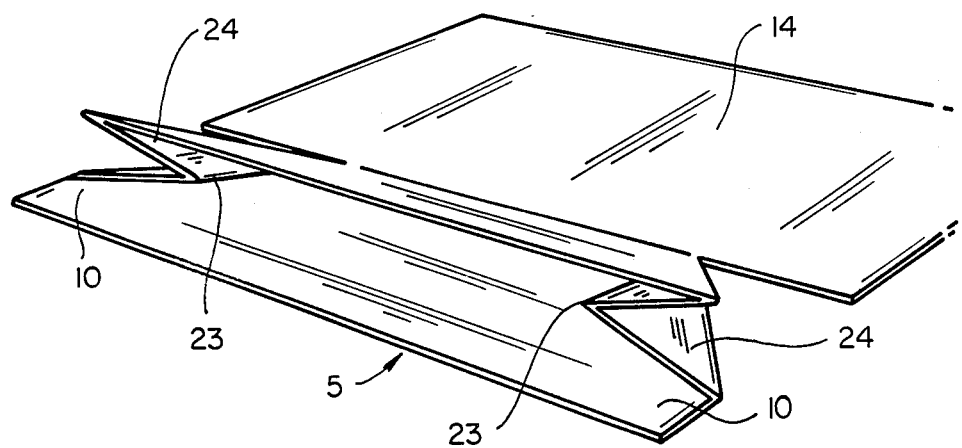
FIG_8a
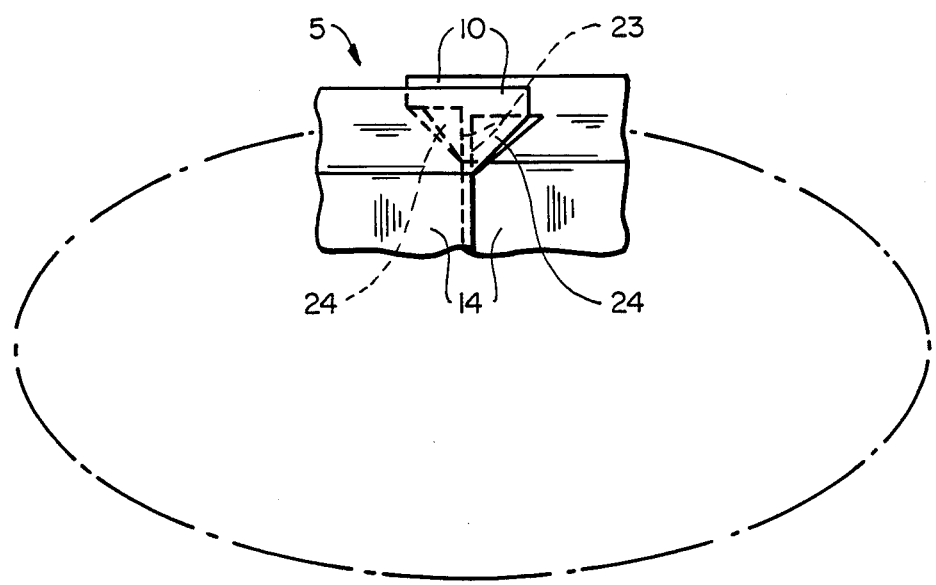
FIG_8b

4,767,652

PRESSURE RETAINING ENCLOSURE

This application is a continuation of copending application Ser. No. 689,623 filed Jan. 8, 1985, now U.S. Pat. No. 4,614,557.

BACKGROUND OF THE INVENTION

This invention relates to the formation of an enclosure, capable of retaining pressure, especially for environmental sealing of substrates such as splices in pressurized cables.

Although the invention is applicable to the formation of other pressure vessels it will be described primarily in term of the formation of a pressurized splice case for a telecommunications cable.

A cable splice must be protected against the environment if the supply lines within it (for example electrical conductors) are to function over their intended lifetime. A major cause of failure in telecommunications cables is due to water or moisture vapour in contact with the conductors, and such water or vapour is most likely to enter the cable at points where it has been spliced or repaired. Splice cases and repair sleeves must therefore provide a very effective environmental seal over a long period of time. There is a further requirement, however, in respect of some of the larger cables. Main telecommunications cables are generally pressurized with dry air from the exchange, firstly to prevent ingress of water vapour (or other contaminants) and secondly to provide an early indication, by means of a localized pressure drop, of where and when a leak has occured.

Pressurization of cables puts a further requirement on the design of splice cases, repair sleeves and terminations etc: the enclosure around the cable must engage the cable in such a way that the engagement will not fail due to the pressure within the enclosure.

A seal between the cable and the enclosure is generally provided by an adhesive bond. However, for the purposes of the present invention, a sealant such as a mastic with little or no adhesive properties, or a mere mechanical force between cable and enclosure will be sufficient. This seal, like any such seal, is most susceptible to failure by peel, a greater force being required to separate surfaces by a sheer force for example. Pressure within the enclosure may unfortunately put the seal into peel.

Attention has therefore been directed to ways of sealing the enclosure to the cable such that internal pressure does not cause peel. One solution is to provide the enclosure with specially formed end pieces which have what is known as an inside-out configuration: thus, the ends of the enclosure do not simply taper down onto the cable forming an actuate angle with it, but instead are turned in on themselves such that the outer surface of each end piece seals to the cable. In this way, pressure within the cable tends to reinforce the seal.

A disadvantage of this solution is the cost of such end pieces and the fact that any given end piece is limited to a very narrow range of cable sizes and can not in general be used around cable branch-offs.

The desire for simplicily of installation and reduction of inventory and cost, has led to the use of simple recoverable sleeves, particularly wrap-around sleeves, for the formation of splice cases. Although such sleeves may be manufactured with a shape having regard to the shape or configuration of splice to be enclosed, an inside-out configuration will generally not be provided.

The sleeves are preferably heat-shrinkable being made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the originally dimensionally heat stable form may be a transient form in a continuous process in which, for example, an extruded tube is expanded whilst hot, to a dimensionally heat-unstable form, but in other applications a preformed dimensionally heat stable article is deformed to a dimensionally unstable form in a separate stage.

In other articles, as described for example in UK Pat. No. 1440524 (equivalent to U.S. Pat. No. 4,035,534), an elastomeric member such as an outer tubular member is held in a stretched state by a second member, such as an inner tubular member which, upon heating, weakens and thus allows the elastomeric member to recover.

UK Pat. No. 2113925 (equivalent to U.S. Pat. No. 4,466,846) discloses a basic solution whereby such sleeves may be made pressure retaining over the long periods of time required. A sealing strip is provided which can be wrapped around the cable and over which a recoverable sleeve is recovered, such that the strip is positioned at a junction between the cable and the sleeve. The sealing strip, in a preferred embodiment, has a V-shaped cross-section, one arm of the V becoming bonded to the sleeve and the other to the cable. Pressure within the sleeve can cause the V to open out. It can be seen that the junction between the cable and the sleeve is not put in peel by internal pressure, due to interposition of the sealing strip. It may be noted here that bond between an arm of the V and the cable (and between the other arm and the sleeve) is not subjected to peel by internal pressure, but on the contrary may be reinforced by the pressure. Thus, even if the distal end of that arm were not bonded to the cable there would be no tendency for the bond between the remainder of the arm and cable to fail, the reason being that equal pressures act against each surface of the end of that arm.

Where an enclosure extends around the entire periphery of the substrate (as in the case of a sleeve around a cable) then the sealing strip must likewise extend around the entire periphery of the substrate if the entire seal requires protection against peel. This is clearly not a problem if the sealing strip has the form of an annulus. If, however, the strip has ends (which is desirable since it allows the strip to be wrapped-around the substrate rather than slid over a free end of the substrate) then consideration must be given to pressure retention by the strip at its ends. In an embodiment of GB No. 2113925 the two arms of the V are bonded together at each end of the strip. The strip may thus be wrapped around the cable with its ends overlapping, pressure being retained between the arms of the V by its closed ends.

SUMMARY OF THE INVENTION

We have now devised a method of forming a pressurizable enclosure which employs a sealing strip within the general class disclosed in GB No. 2113925, and which allows the strip to be cut to length and which will therefore have at least one end which is open.

Thus, the present invention provides a method of forming an enclosure around a substrate, which comprises:

(a) positioning a cover around the substrate such that a seal between the substrate and the cover is susceptible to peel by pressure within the enclosure adjacent the seal; and (b) positioning around the substrate and within the cover a flexible sealing strip which is re-entrant in transverse cross-section, which has an open end, and which bridges said seal by means of a first surface which contacts the cover and a second surface which contacts the substrate, thereby reducing or eliminating said peel;

said strip in use being so positioned and having such a configuration that a leak path through said open end to said seal is closed by an opposing end portion of the strip which is either forced against said open end by pressure within the enclosure, or which balances pressure within said open end.

The specified configuration of the "open end" preferably allows some displacement of that open end relative to the opposing end portion to occur, whilst retaining closure of the leak path referred to. Clearly this is desirable since it allows some freedom in the way in which the sealing strip is installed.

The ability of the sealing strip to be cut to length allows a continuous manufacturing method, and reduces inventory since a length of sealing strip can be trimmed in the field to suit the substrate to be enclosed.

The enclosure is preferably formed by installing a sealing strip around the substrate at the or each position where the cover is to seal to the substrate, and then to install the cover. The cover is preferably a wrap around sleeve, in which case the method will additionally comprise securing the sleeve in its wrap around configuration. As mentioned above, such sleeves are preferably heat-shrinkable, in which case the sleeve will be heated to cause it to engage the substrate. A heat-activatable sealing material is preferably provided to seal the sleeve to the cable and to seal cable and sleeve to the sealing strip. In this case a single heating step may cause heat-recovery and activation of the sealing material.

BRIEF DESCRIPTION OF THE DRAWINGS

FIG. 1 shows an enclosure around a cable splice;

FIG. 2 shows a prior art sealing strip in perspective view;

FIG. 3a and 3b show a leak path that may result from simple modification of the prior art strip.

FIG. 3b is a cross-section along line BB' of FIG. 3a;

FIGS. 4a and 4b illustrate a strip as used in a first embodiment of the invention.

FIG. 4b is a cross-section of the installed strip of FIG. 4a;

FIGS. 5a and 5b illustrate an installation according to that first embodiment.

FIG. 5b is a profile view of FIG. 5a;

FIG. 6 is an end section showing a strip installed according to that first embodiment;

FIGS. 7a and 7b illustrate a second embodiment.

FIG. 7b is a cross-section taken at position BB' in FIG. 7a;

FIG. 8a and 8b illustrate a third embodiment.

FIG. 8b is a top view of FIG. 8a; and and

FIG. 9 illustrates a method of making a strip for use in the first embodiment.

The drawings therefore show an situation where a sealing strip is required, how a modified prior art strip can produce an unacceptable leak path, and three ways in which the problem of an open end can be solved. The shape of sealing strip and its particular use in the drawings are merely illustrative.

DESCRIPTION OF THE PREFERRED EMBODIMENTS

FIG. 1 shows an enclosure formed by a cover 1 surrounding a substrate. The cover is preferably a recoverable sleeve, particularly a wrap-around sleeve such as that disclosed in GB No. 1155470 (equivalent to U.S. Pat. No. 3,455,336). The substrate is preferably a splice 2 between cables 3, particularly between pressurized telecommunications cables. The sleeve may be coated on an internal surface with a sealing material, such as a sealant for example a mastic, or a heat-activatable adhesive for example a hot-melt adhesive. In connection with this general figure it may be mentioned that such splice cases are commonly used to enclose branch-off's between cables, in which instance one or both ends of the sleeve would surround more than one cable. Some means for sealing the branch-off region, for example a branch-off clip, would also be provided. A liner may also be provided within the sleeve for mechanical protection of the splice bundle or to provide a further moisture vapour barrier.

A seal between the cover 1 and the substrate 2,3 which is susceptible to peel by an internal pressure P is indicated at 4a. This seal may be mere mechanical engagement, or may result at least partially from a sealing material, for example from the coating on the sleeve referred to above.

Peel of the seal 4b at the right-hand side of FIG. 1 has been reduced or eliminated by the positioning of a sealing strip 5, shown in outline. The sealing strip can be seen to be re-entrant in transverse cross-section. The strip illustrated is substantially V-shaped in transverse cross-section, but it is to be understood that the invention is not limited to any particular shape in this respect. Pressure between the arms of the V tends to cause the V to open out, but does not put the seal 4b into peel. A release layer 6 is shown between the arms of the V to prevent them sticking together during installation.

FIG. 1 shows a first surface of the sealing strip 8 which contacts the cover 1, and a second surface 9 which contacts the substrate 3.

A prior art sealing strip 5 is shown in FIG. 2. It can be seen to have closed ends 7. When the strip 5 is installed around a cable, the ends 7 overlap one another. This sealing strip clearly has a fixed length; if it were cut in the field to alter its length to suit a smaller substrate that the one it was designed for, one of its ends would become open (the part 7 being removed). It would not then function in the way intended.

The effect of modifying the prior art strip merely by cutting away its closed end, and then using it in the old way is shown in FIG. 3. In practice the installer can never ensure that the overlapping ends of the strip 5a and 5b are aligned one precisely over the other. A slight mis-alignment is shown in FIG. 3a. A leak path exists through one of the open ends 10, where pressure P can be transmitted to the seal between sleeve and cable. A cross-section along line BB' of FIG. 3a is shown in FIG. 3b. The overlying part of the strip is shown as 5a, and the underlying part as 5b. At the point where the cross-section is taken 5a is continuous and the strip is shown shaded to show that there is no leak path. At this cross-section, however, part 5b ends and thus pressure P can escape. It can be seen from FIG. 3b that there is no equalization of pressure at the apex of the V shown as 5b. Pressure within part 5b will therefore escape, putting the seal 4 into peel. This unacceptable situation will arise however small the misalignment between the ends 5a and 5b. The prior art sealing strip cannot therefore be cut to length and then subsequently installed as directed by the prior art.

FIG. 4 shows a configuration of sealing strip 5 having an open end 10 in which a leak path through that open end to the seal 4 between cable 3 and sleeve 1 is closed by an opposing end portion 11 of the strip which is forced against said open end 10 by pressure within the enclosure 1. This is achieved by positioning the open end 10 to lie within said opposing end portion 11.

The configuration is shown in perspective in FIG. 4a, and a cross-section of the installed strip is shown in FIG. 4b. FIG. 4b shows the relationship between contact (or bond) 12 between the first and second surfaces of the strip 8,9 and the cover and cable, and contact (or bond) 13 between the overlapping portions of the strip. Contact 13 must run from area of contact 12a to area of contact 12b. This contact path need not lie within a single cross-section, but may extend along the length of the strip 5. It can be seen that the precise alignment between the two ends of the strip 5 is not critical in the sence that alignment in FIG. 3 was critical. The contacts (or bonds) 12 and 13 are shown localized but in practice they may extend over greater areas.

Proper installation of a strip in the way shown in FIG. 4 would be difficult if one end 10 were simply slid inside the opposing end portion 11. FIG. 5 shows a technique whereby the configuration of FIG. 4 may be more easily achieved.

The cable circumference is measured, and the strip is cut to a suitable length, preferably allowing an overlap of 15-50 mm particularly about 25 mm. The surface of the cable may be prepared by, for example, one or more of: cleaning, abrading, and flame brushing. Then, the strip 5 is wrapped around the cable as shown in FIG. 5a. Before wrapping, the strip has first and second surfaces 8,9 subtending an angle of substantially 180°. The strip shown in FIG. 5 has a flap 14 along its length which extends from a region between the first and second surfaces (in this case from the region where they meet) in a direction away from the first and second surfaces. The flap 14 preferably comprises a heat-activatable (preferably hot-melt) adhesive 15 and a foil (preferably aluminium) strip 16. The strip 5 is also provided with pressure sensitive adhesive strips 17 to secure it to the cable 3.

A tape wrap 18, preferably of PVC adhesive tape, is then applied along the cable 3 and over the second surface 9 of the strip 5, thereby fully securing the surface 9 to the cable 3 and/or providing a release layer between the surface 9 and the surface 8 when the strip 5 is in use. The tape should be wrapped over the length marked A, which preferably extends onto the cable 3 a distance 5-20, more preferably about 10 mm.

Once the tape 18 has been applied, the first surface 8 of the strip 5 is then turned back over the second surface 9, as shown by the arrows in FIG. 5b, such that an acute angle is substended between the first and second surface. The strip 5 will then have a re-entrant configuration in cross-section.

A sleeve or other cover would then be installed over the cable 3 to engage the cable at the position of the adhesive part 15 of the flap 14. The part 15 will therefore constitute at least part of the seal between the sleee and cable.

FIG. 6 is a transverse end section through a cable, sealing strip, and sleeve. The sealing strip is installed as shown in FIG. 5. The cable 3 is surrounded by strip 5, the second surface 9 of which is taped down by tape 18. The first surface 8 is bonded to the sleeve 1 by means of an adhesive coating 19 originally provided on the sleeve. An adhesive 20, preferably a hot-melt adhesive, bonds the second surface 9 to the cable 3.

An alternative configuration of sealing strip is shown in FIG. 7. Here only one end 10 of the strip is open, the opposing end portion 11 having a closed end 21. In this case a leak path through the open end 10 is closed by the opposing end portion 11 which balances pressure within the open end 10. The way in which this balance occurs will be described below with reference to FIG. 7b.

The overal design of the sealing strip is shown in FIG. 7a. The strip 5 has a flap 14 which extends from a region between the first and second surfaces 8,9 (in particular from a line where they join) in a direction away from said first and second surfaces. The strip 5 is wrapped around a substrate so that the first and second surfaces 8,9 at the open end 10 lie on the same side (the underside as drawn) of the opposing end portion 11, and the apex 23 of the open end 10 lies on the opposing end portion 11 (contrast FIG. 3a). The precise relative alignment of open end 10 and opposing end portion 11 is not critical due to the greater width of the opposing end portion. A hole 22 may be provided in the flap 14 to ensure that the open end 10 does indeed lie within the region of greater width; the underlying cable, and not an opposing end of the flap, should be visible through the hole.

FIG. 7b, which may be compared with FIG. 3b, shows how this configuration produces a balance of pressure at the open end 10. As before, a sleeve 1 is positioned around a cable 3, and sealed by a seal 4 which is to be protected from peel. FIG. 7b is a cross-section taken at position BB' of FIG. 7a showing the wide opposing end portion 11 overlying the narrower open end 10. At this cross-section the part of the strip 5a is closed (due to closed end 21) and the part of the strip 5b is open. No leak path through the apex 23 will occur because this end is closed by the overlying end portion 11 (it is shown opened out for clarity). Since the same pressure P exists in the part 5b and above it in part 5a there will be no tendency for a leak to develop. (It may be noted here that the end of the strip 5a shown in FIG. 3 is safe for the same reasons, but end 5a is only safe because the alignment is such that failure occurs through end 5b.)

A third embodiment is shown in FIG. 8. Here the ends are folded in on themselves at 24 so that the apexes 23 of the open ends lie over opposing end portions. A leak path at each end is therefore closed by the balance of pressure in the same way as described for one end in FIG. 7. The ends may be simply folded over, as opposed to being tucked inside as drawn.

FIG. 9 shows a sealing strip during manufacture, suitable for use in the embodiment of the invention shown in FIGS. 4-6. The strip may be manufactured by a continuous process.

A tube 25 of material, such as an EVA copolymer, is extruded optionally with pre-stretching and then preferably cross-linked. It is then coated first on one side with a layer of a hot-melt adhesive 15 (preferably a polyamide) and then on the other side with a similar layer 15. An aluminium foil 16 is also rolled onto the strip. A further component that may be included are strips 17 of a pressure-sensitive adhesive. The resulting strip is then slit along the central dotted line to produce two sealing strips 5. Each sealing strip may then be cut to length as required. A typical width is 30–55, especially about 43 mm, for the first and second surfaces. The strip could be supplied in long lengths to allow several installations to be made, or pre-cut to approximate length for mere trimming in the field. The sleeve and sealing strip, together with other components for making a cable splice or other enclosure are preferably supplied in kit form.

We claim:

1. A kit for forming a pressurizable enclosure around a substrate, which comprises:
   (a) a recoverably sleeve; and
   (b) a flexible sealing strip for positioning around the substrate between the substrate and the sleeve, the sealing strip having two arms for contacting respectively the sleeve and the substrate around its perimeter, the arms being joined together along the length of the strip and the strip having at least one open end.

2. A kit according to claim 1, in which the sleeve is heat-recoverable.

3. A kit according to claim 1, in which the sealing strip has a coating of sealing material on those surfaces of the arms which in use contact the sleeve and the substrate respectively.

4. A kit according to claim 3, in which the sealing material is a hot-melt adhesive.

5. A kit according to claim 1, in which the sealing strip has a flap along its length which extends from the joint between the arms.

6. A kit according to claim 6, in which the flap extends in a direction away from the arms.

7. A kit according to claim 5, in which the flap comprises a hot-melt adhesive.

8. A kit according to claim 5, in which the flap comprises a foil coated with a pressure sensitive adhesive.

9. A kit according to claim 1, which includes an adhesive tape.

* * * * *